United States Patent
Pfleger

(10) Patent No.: US 8,549,042 B1
(45) Date of Patent: Oct. 1, 2013

(54) SYSTEMS AND METHODS FOR SORTING AND DISPLAYING SEARCH RESULTS IN MULTIPLE DIMENSIONS

(75) Inventor: Karl Pfleger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 19 days.

(21) Appl. No.: 13/422,358

(22) Filed: Mar. 16, 2012

Related U.S. Application Data

(63) Continuation of application No. 12/622,871, filed on Nov. 20, 2009, now Pat. No. 8,161,072, which is a continuation of application No. 10/813,229, filed on Mar. 31, 2004, now Pat. No. 7,660,822.

(51) Int. Cl.
*G06F 17/30* (2006.01)

(52) U.S. Cl.
USPC ............ 707/798; 707/802; 707/822; 707/828

(58) Field of Classification Search
USPC .................................................. 707/600–899
See application file for complete search history.

(56) References Cited

U.S. PATENT DOCUMENTS

| | | | |
|---|---|---|---|
| 6,055,531 A * | 4/2000 | Bennett et al. | 1/1 |
| 6,507,343 B1 | 1/2003 | MacPhail | |
| 6,904,427 B1 | 6/2005 | Hagiwara et al. | |
| 7,072,863 B1 | 7/2006 | Phillips et al. | |
| 7,117,217 B2 | 10/2006 | Ooi et al. | |
| 7,660,822 B1 | 2/2010 | Pfleger | |
| 2003/0126601 A1 | 7/2003 | Roberts et al. | |
| 2003/0174173 A1 | 9/2003 | Nishiyama et al. | |
| 2004/0006556 A1 | 1/2004 | Kwoh | |

OTHER PUBLICATIONS

Co-pending U.S. Appl. No. 12/622,871, filed Nov. 20, 2009, to Karl Pfleger, 29 pages.

* cited by examiner

*Primary Examiner* — Isaac M Woo
(74) *Attorney, Agent, or Firm* — Harrity & Harrity, LLP

(57) ABSTRACT

A system plots results of a data search. The system executes one or more search queries to search stored data. The system receives results of the executed one or more search queries, where the results are orderable by at least one search characteristic. The system designates a visual representation for each of the results. The system plots each of the visual representations on a multi-dimensional graphical display, where at least one dimension of the multi-dimensional graphical display corresponds to the at least one search characteristic.

20 Claims, 10 Drawing Sheets

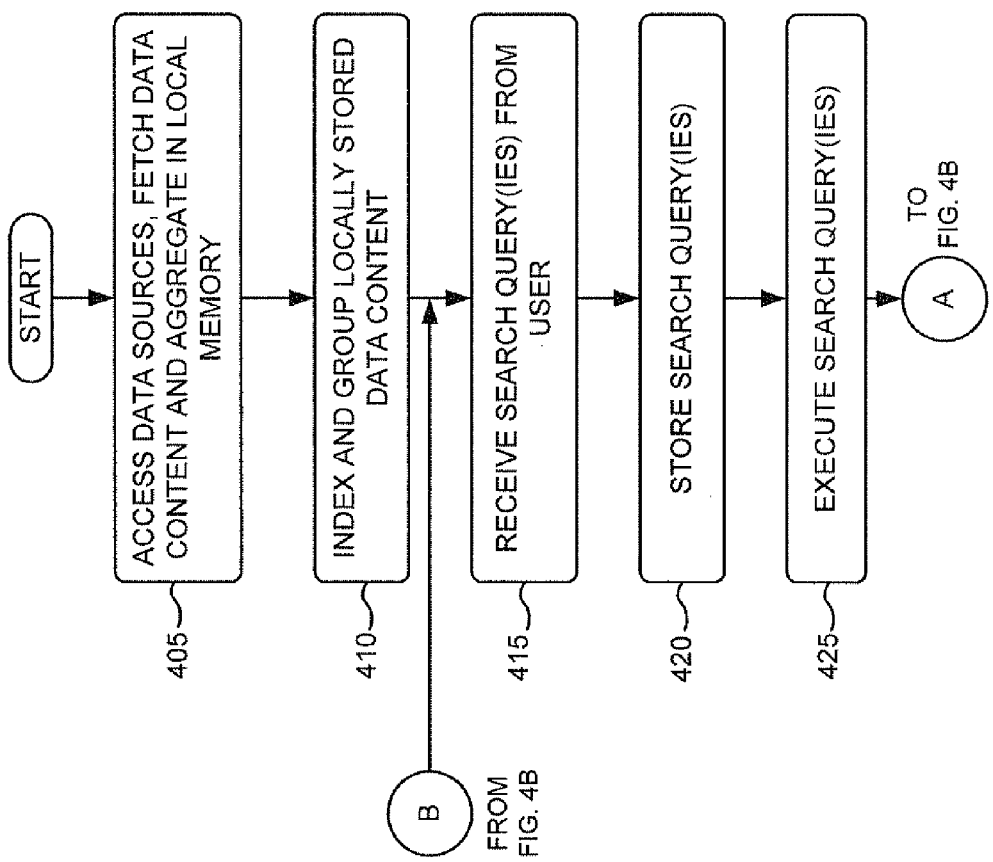

SYSTEMS AND METHODS FOR SORTING AND DISPLAYING SEARCH RESULTS IN MULTIPLE DIMENSIONS

RELATED APPLICATIONS

This application is a continuation of co-pending U.S. patent application Ser. No. 12/622,871, filed on Nov. 20, 2009, which is a continuation of co-pending U.S. patent application Ser. No. 10/813,229, filed Mar. 31, 2004, now U.S. Pat. No. 7,660,822, the disclosures of which are hereby incorporated by reference herein.

BACKGROUND OF THE INVENTION

1. Field of the Invention

The present invention relates generally to information searching systems and, more particularly, to systems and methods for sorting and displaying searches of aggregated information in multiple dimensions.

2. Description of Related Art

Existing information searching systems use search queries to search through aggregated data to retrieve specific information that corresponds to the received search queries. Such information searching systems may search information stored locally, or in distributed locations. The World Wide Web ("web") is one example of information stored in distributed locations. The web contains a vast amount of information and locating a desired portion of that information, however, can be challenging. This problem is compounded because the amount of information on the web and the number of new users inexperienced at web searching are growing rapidly.

Search engines attempt to return hyperlinks to web documents in which a user is interested. Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web documents. Web documents that contain the user's search terms are "hits" and are returned to the user. The search engine oftentimes ranks the documents using a ranking function based on the documents' perceived relevance to the user's search terms.

In addition to determining relevance, existing search paradigms may use other dominant characteristics to sort the results of a search. For example, in shopping or product search (e.g., Froogle), users typically like to sort by price. As another example, when searching news stories or USENET/ groups, users typically prefer to sort by date or recency. As a further example, when searching images, users may prefer to sort by image quality or image size. As yet another example, in geographic search, users may prefer to sort by distance. With existing search paradigms, users must choose to sort either by relevance or by the alternative characteristic, and can at best toggle between these modes. This creates a frustrating experience for the user in which important sorting dimensions are ignored (e.g., the user retrieves a lot of very cheap products that aren't what they wanted, or the user gets a lot of very recent articles that are not really about the topic they wanted). Existing search paradigms employed in any type of information searching system, thus, make it very difficult for users to easily find reasonably relevant data while, at the same time, also optimizing at least one other desired characteristic.

Accordingly, it would be desirable to implement a search paradigm in an information searching system that permits sorting and display of search results by multiple alternative characteristics.

SUMMARY OF THE INVENTION

Systems and methods, consistent with the principles of the invention, implement a search paradigm that permits users to search and sort data according to multiple characteristics. Such characteristics may include relevance or another alternative characteristic, such as, for example, price, date, recency, image quality, image size, or geographic distance. Consistent with the principles of the invention, results of a search that sorts by multiple characteristics may be displayed in a document that plots the results of the search in a multi-dimensional graph, with each dimension of the graph corresponding to one of the multiple characteristics.

According to one aspect consistent with the principles of the invention, a method of displaying the results of a search is provided. The method includes receiving one or more search queries. The method further includes searching stored data based on the one or more search queries to generate results, where the results are orderable by at least one search characteristic. The method also includes providing a document that includes a multi-dimensional graph of the results of the search, where at least one dimension of the multi-dimensional graph corresponds to the at least one search characteristic.

According to another aspect, a method of plotting results of a data search is provided. The method includes executing one or more search queries to search stored data. The method further includes receiving results of the executed one or more search queries, where the results are orderable by at least one search characteristic. The method also includes designating a visual representation for each of the results and plotting each of the visual representations on a multi-dimensional graphical display, where at least one dimension of the multi-dimensional graphical display corresponds to the at least one search characteristic.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 4A and 4B are flowcharts of exemplary processing for providing multi-dimensional display documents according to an implementation consistent with the principles of the invention;

DETAILED DESCRIPTION

The following detailed description of the invention refers to the accompanying drawings. The same reference numbers in different drawings may identify the same or similar elements. Also, the following detailed description does not limit the invention.

Systems and methods consistent with the principles of the invention implement a search paradigm that permits users to search and sort data according to multiple characteristics, such as, for example, relevance, price, date, recency, image quality, image size, or geographic distance. The results of the search may be plotted on a multi-dimensional graph, with each dimension of the graph corresponding to one of the multiple characteristics.

A "document," as the term is used herein is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.).

Exemplary System Overview

Figure 1:
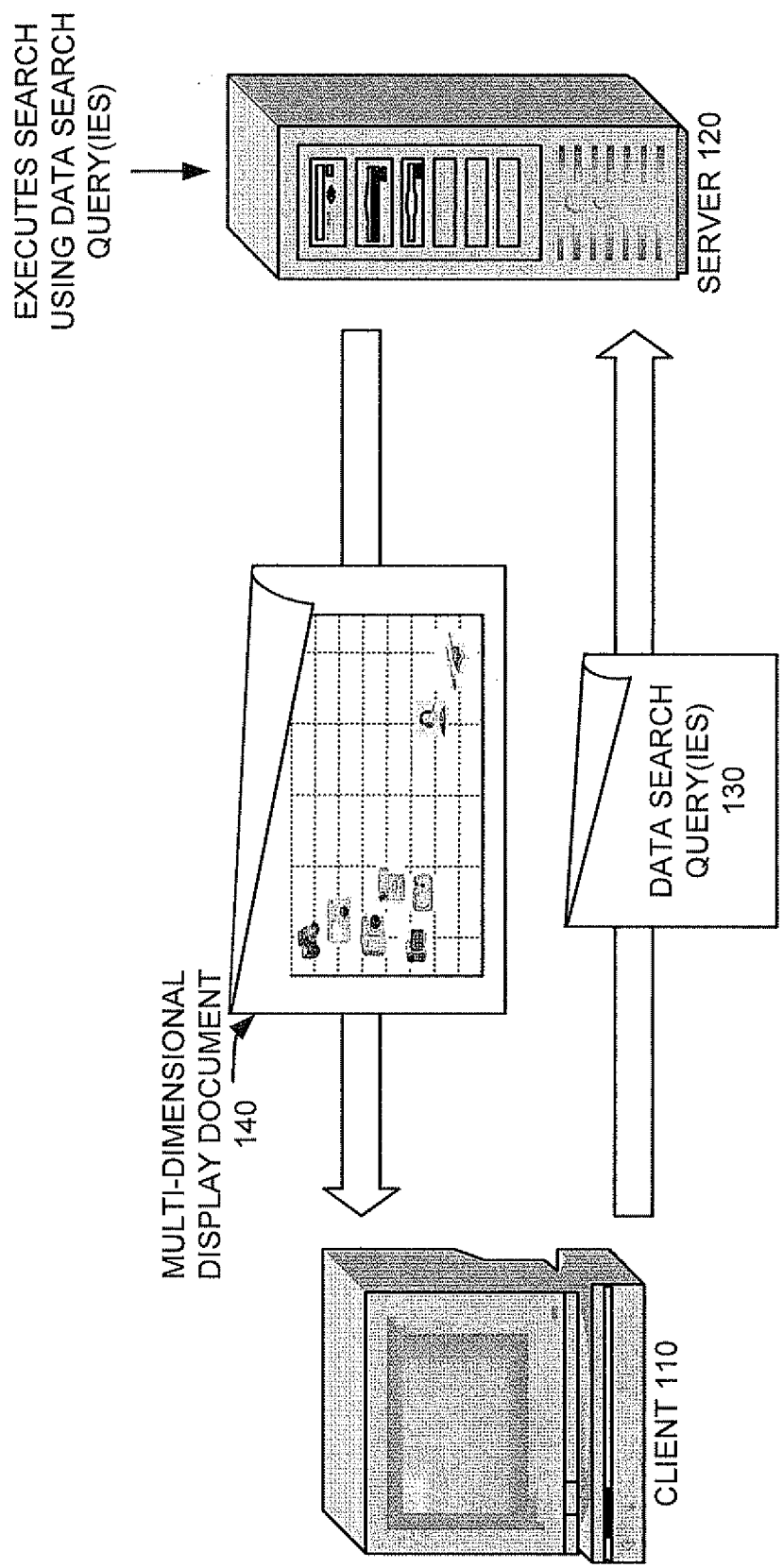
FIG. 1 is a diagram of an overview of an exemplary implementation of the invention.

FIG. 1 illustrates a system overview of one exemplary implementation of the invention. As shown in FIG. 1, a server 120 may receive one or more data search queries 130 from a client 110 via, for example, a network (not shown). The one or more data search queries 130 may be explicitly provided by a user at the client 110, or may, for example, be inferred from the user's past "web browsing" activity. The one or more search queries may be derived in any manner, such as, for example, user selection from a list of related search queries, user selection from a list of "canned" queries, etc. Server 120 may perform a search of aggregated data using the received one or more data search queries. The aggregated data may include data retrieved and aggregated from one or more data sources, such as, for example, news sources, image sources, product sources, or any other type of data source.

Server 120 may sort the results of the search using multiple characteristics derived, at least in part, from the received one or more data search queries. For example, in one implementation, server 120 may sort the results of the search based on relevance and one other characteristic, such as, for example, price, data, recency, image quality, image size, or geographic distance. In other implementations, server 120 may sort the results of the search based on multiple characteristics, such as any combination of three or more of the above noted characteristics. Using the results of the search and sort, server 120 may then provide a multi-dimensional display document 140 to client 110. Multi-dimensional display document 140 may plot the results of the search with each of the multiple characteristics, used to sort the results of the search, being represented as a dimension on the plot. For example, if document 140 includes a two-dimensional plot, then one dimension may be relevance, and another dimension may be price. Multi-dimensional display document 140 may include any number of dimensions (e.g., 2, 3, 4, etc.).

Exemplary Network Configuration

Figure 2:
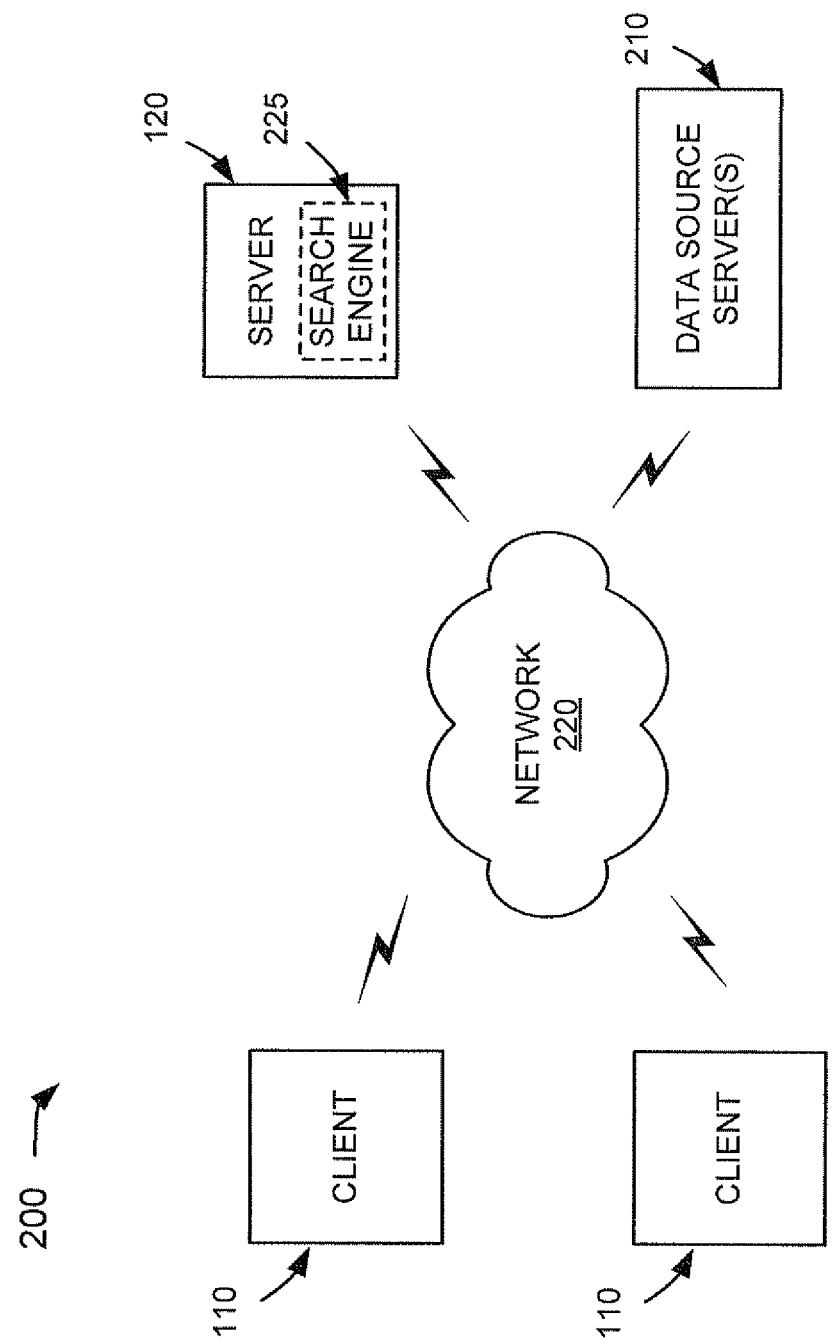
FIG. 2 is a diagram of an exemplary network in which systems and methods consistent with the principles of the invention may be implemented.

FIG. 2 is an exemplary diagram of a network 200 in which systems and methods consistent with the principles of the invention may be implemented. Network 200 may include multiple clients 110 connected to multiple servers 120 and 210 via a network 220. Network 220 may include a local area network (LAN), a wide area network (WAN), a telephone network, such as the Public Switched Telephone Network (PSTN), an intranet, the Internet, a memory device, another type of network, or a combination of networks. Two clients 110 and two servers 120 and 210 have been illustrated as connected to network 220 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Servers 120 and 210 may include server entities that gather, process, search, and/or maintain documents in a manner consistent with the principles of the invention. Clients 110 and servers 120 and 210 may connect to network 220 via wired, wireless, and/or optical connections.

In an implementation consistent with the principles of the invention, server 120 may include a search engine 225 usable by users at clients 110. Server 120 may implement a data aggregation service by crawling a corpus of documents (e.g., web pages) hosted on data source server(s) 210 and store information associated with these documents in a repository of crawled documents. The data aggregation service may be implemented in other ways, such as by agreement with the operator(s) of data source server(s) 210 to distribute their hosted documents via the data aggregation service. Server 120 may additionally provide multi-dimensional plots of data retrieved based on one or more search queries provided by users at clients 110. Each dimension of a multi-dimensional plot may correspond to a characteristic of the one or more search queries used to sort the searched data.

Server(s) 210 may store or maintain documents that may be crawled by server 120. Such documents may include data related to published news stories, products, images, user groups, geographic areas, or any other type of data. For example, server(s) 210 may store or maintain news stories from any type of news source, such as, for example, the Washington Post, the New York Times, Time magazine, or Newsweek. As another example, server(s) 210 may store or maintain data related to specific product data, such as product data provided by one or more product manufacturers.

While servers 120 and 210 are shown as separate entities, it may be possible for one or more of servers 120 and 210 to perform one or more of the functions of another one or more of servers 120 and 210. For example, it may be possible that two or more of servers 120 and 210 are implemented as a single server. It may also be possible for a single one of servers 120 or 210 to be implemented as two or more separate (and possibly distributed) devices.

Exemplary Client/Server Architecture

Figure 3:
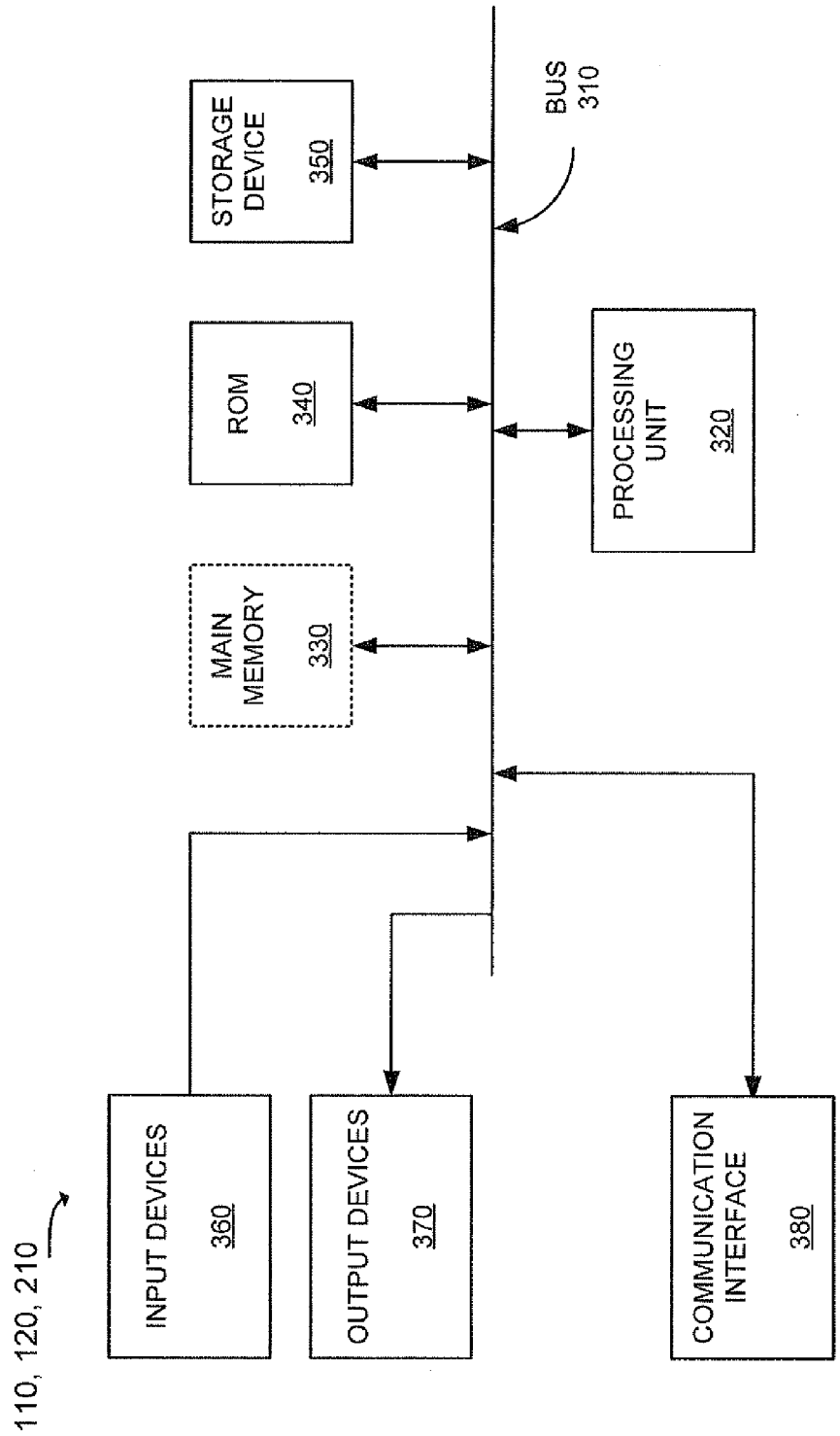
FIG. 3 is an exemplary diagram of a client and/or server of FIGS. 1 & 2 in an implementation consistent with the principles of the invention.

FIG. 3 is an exemplary diagram of a client or server entity (hereinafter called "client/server entity"), which may correspond to one or more of clients 110 and servers 120 and 210, according to an implementation consistent with the principles of the invention. The client/server entity may include a bus 310, a processing unit 320, an optional main memory 330, a read only memory (ROM) 340, a storage device 350, one or more input devices 360, one or more output devices 370, and a communication interface 380. Bus 310 may include one or more conductors that permit communication among the components of the client/server entity.

Processing unit 320 may include any type of software, firmware or hardware implemented processing device, such as, a microprocessor, a field programmable gate array (FPGA), combinational logic, etc. Main memory 330 may include a random access memory (RAM) or another type of dynamic storage device that stores information and instructions for execution by processing unit 320, if processing unit 320 includes a microprocessor. ROM 340 may include a conventional ROM device or another type of static storage device that stores static information and/or instructions for use by processing unit 320. Storage device 350 may include a magnetic and/or optical recording medium and its corresponding drive.

Input device(s) 360 may include one or more conventional mechanisms that permit an operator to input information to the client/server entity, such as a keyboard, a mouse, a pen, voice recognition and/or biometric mechanisms, etc. Output device(s) 370 may include one or more conventional mechanisms that output information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 220.

As will be described in detail below, the client/server entity, consistent with the principles of the invention, performs certain searching-related operations. The client/server entity may, in some implementations, perform these operations in response to processing unit 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 may cause processing unit 320 to perform processes that will be described later. Alternatively, hardwired circuitry may be used in place of, or in combination with, software instructions to implement processes consistent with the principles of the invention. Thus, implementations consistent with the principles of the invention are not limited to any specific combination of hardware circuitry and software.

Exemplary Processing

Figure 4B:
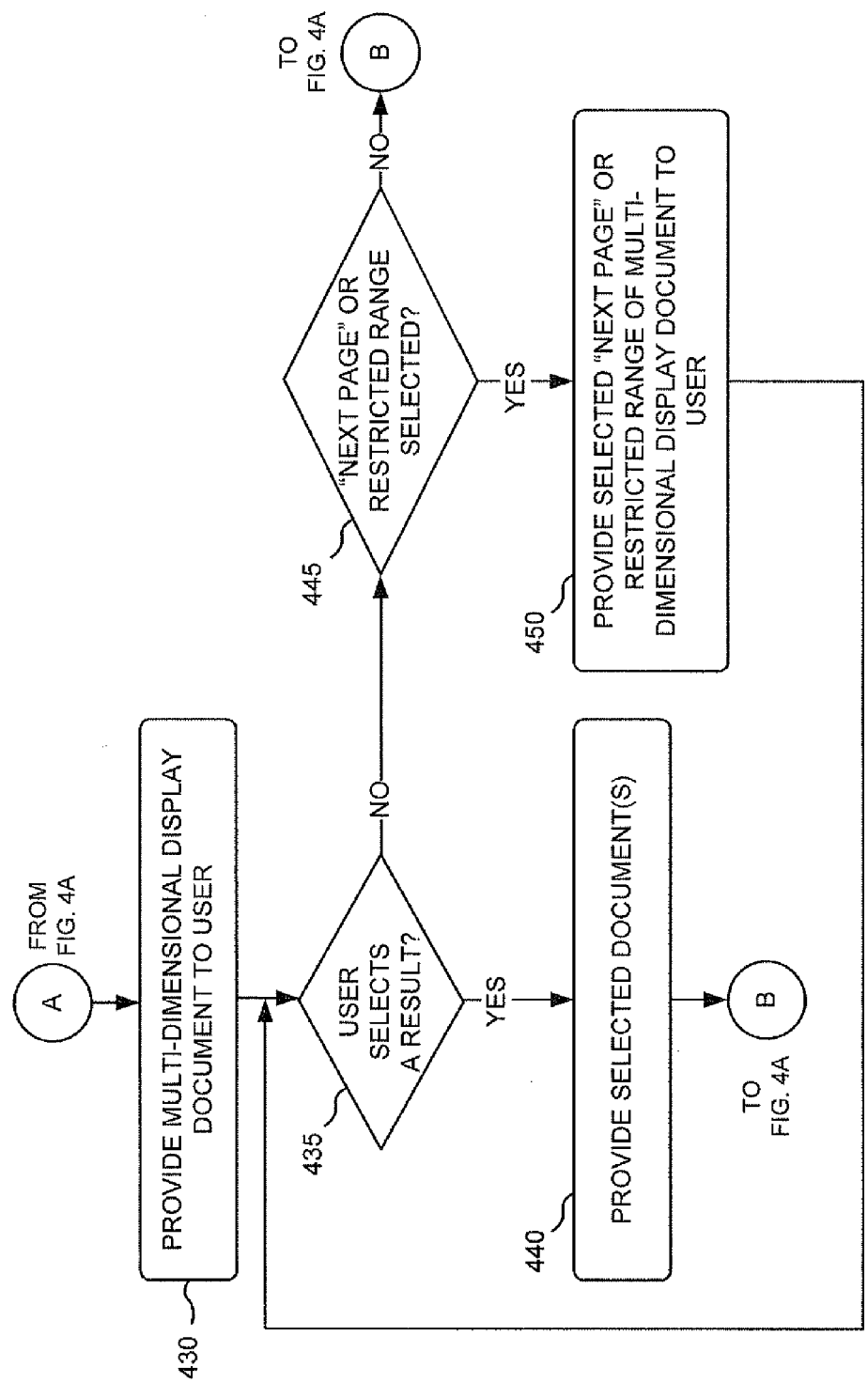

FIGS. 4A and 4B are flowcharts of exemplary processing for providing multi-dimensional display documents according to an implementation consistent with the principles of the invention. As one skilled in the art will appreciate, the processing exemplified by FIGS. 4A and 4B can be implemented in software and stored on a computer-readable memory, such as main memory 330, ROM 340 or storage device 350 of server 120. In other implementations, the processing exemplified by FIGS. 4A and 4B can be implemented in hardwired circuitry, such as combinational logic, within processing unit 320 of server 120.

Processing may begin with server 120 accessing external data sources (e.g., from server(s) 210), fetching the data content stored at the data sources and aggregating the fetched data content in a local memory (act 405) (FIG. 4A). For example, server 120 may use a web crawler (e.g., web robot) that may access documents hosted by data source server(s) 210. Data source server(s) 130 may host, for example, data content related to news, products, images, user groups, or other types of data content. The fetched data content may then be indexed and grouped, using conventional indexing and grouping algorithms (act 410).

Server 120 may then receive one or more search queries from a user at client 110 (act 415). Server 120 may support various types of search queries, such as, for example, searches by price, date, recency, image quality, image size or distance. In one implementation, server 120 may use one or more search queries derived in any type of manner. For example, any type of "clickable" query may be used by server 120. Such "clickable" queries may, include, for example, selections from a list of related queries or selections from categories of queries. In another implementation, search queries entered by the user in the past may be ranked based on recency and frequency and made accessible through a menu placed on a search page for selection by the user. Selecting such a search query may reissue the search query. In a further implementation, one or more search queries may be inferred from the user's current or past browsing activity (e.g., a data search query may include an inferred set of keywords, etc.). Additionally, any combination of the above search queries may be supported by server 120.

Figure 5:
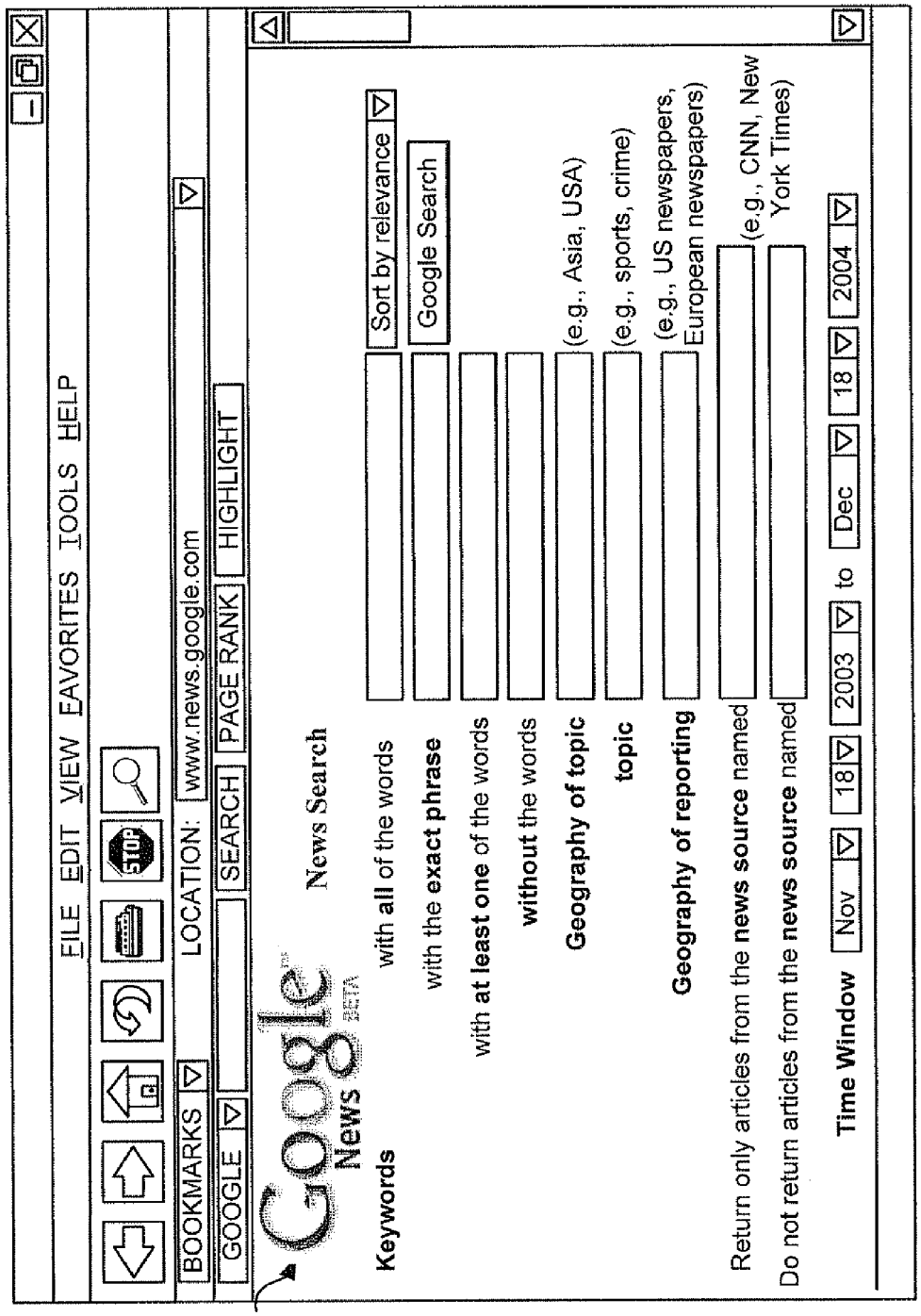
FIG. 5 is a diagram of an exemplary news search document according to an implementation consistent with the principles of the invention.

In one implementation of the invention directed to news searching (e.g., Google News), as shown in FIG. 5, a user may enter search text in a news search page 500. News search page 500 may include various search features that permit the user to specify customized search parameters. News search page 500 may support search query forms such as (a) one or more keywords (e.g., 'with all of the words,' 'with the exact phrase,' 'with at least one of the words,' 'without the words') (b) topical categories (e.g., 'topic=sports,' 'topic=crime'; (c) geographical categories (e.g., 'geo=Asia,' 'geo=USA'); (d) geographical reporting areas (e.g., U.S. newspapers, European newspapers, etc.); (e) restrictions on the news sources to be considered (e.g., 'return only articles from the news sources named,' 'do not return articles from the new source named'); and/or (g) a time window that defines a start and end of a time interval from which articles may be retrieved. A search query may additionally include any combination of the above forms of search query.

Figure 6:
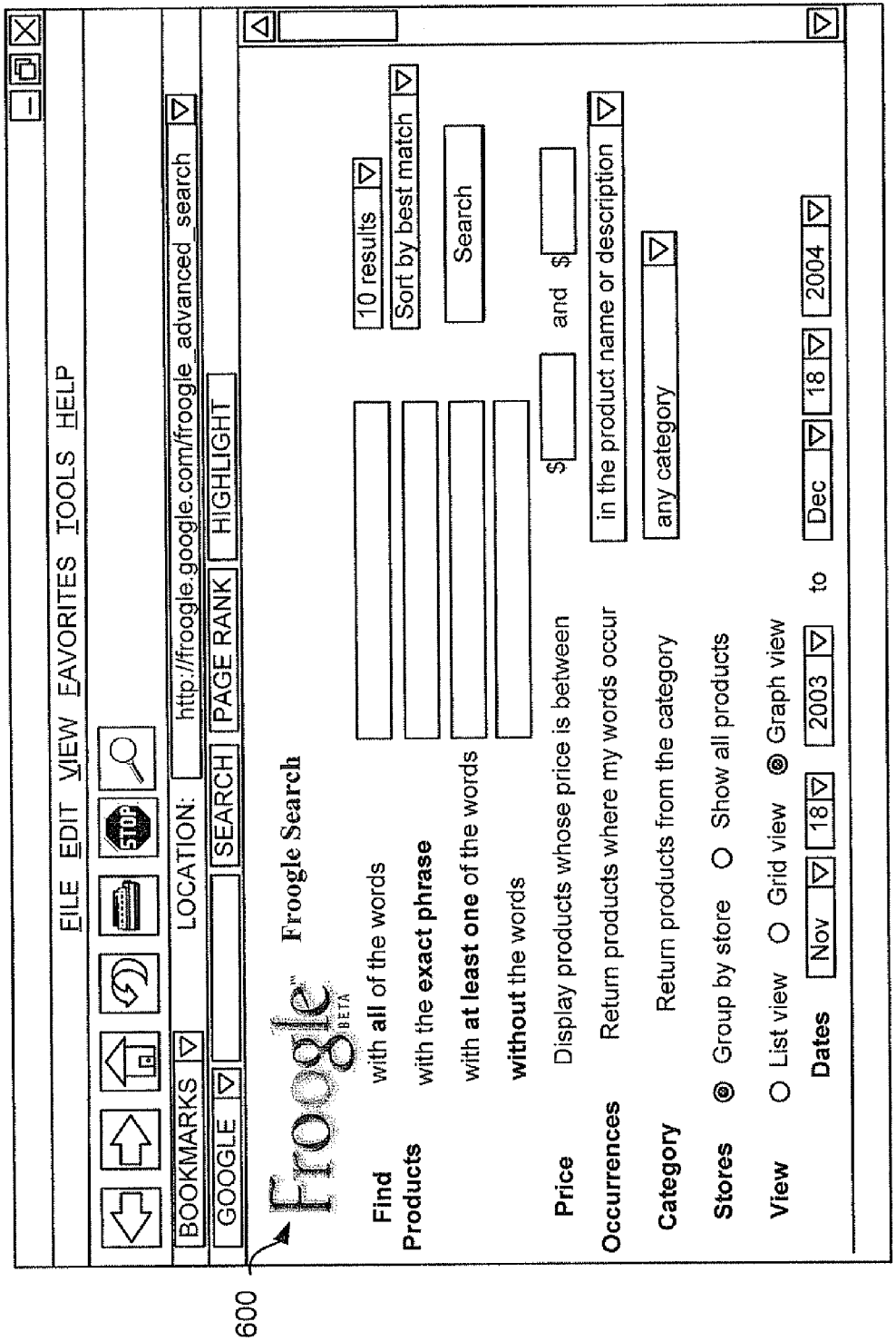
FIG. 6 is a diagram of an exemplary product search document according to an implementation consistent with the principles of the invention.

In another implementation of the invention directed to product searching, as shown in FIG. 6, a user may enter search text in a product search page 600. Product search page 600 may include various search features that permit the user to specify customized search parameters. Product search page 600 may support search query forms such as (a) one or more keywords (e.g., 'with all of the words,' 'with the exact phrase,' 'with at least one of the words,' 'without the words'); (b) a product price range (e.g., 'display products whose price is between'); (c) a specification of where the one or more keywords should occur (e.g., 'in the product name or description,' 'in the product description'); (d) a product category (e.g., 'return products from the category'); (e) a specification of whether to group by store (e.g., 'group by store,' 'show all products'); (f) a view selection (e.g., 'list view,' 'grid view,' 'graph view'); and/or (g) a time window that defines a start and end of a time interval from which product data may be retrieved. A search query may additionally include any combination of the above forms of search query.

Server 120 may then store the one or more search queries in local memory (e.g., main memory 330, ROM 340 or storage device 350) (act 420). Server 120, using search engine 225, may execute the one or more search queries (act 425). The results of the executed search queries may be sorted using existing sorting techniques. Such sorting techniques may, for example, sort the results of the executed search queries by relevance. The sorting techniques may further sort the results of the executed search queries by one or more additional characteristics, such as, for example, price, date, recency, image quality, image size, geographic distance, etc.

The sorted results of the one or more search queries may be provided to the user as a multi-dimensional display document (act 430) (FIG. 4B). The multi-dimensional display document may include a multi-dimensional graph of the sorted results of the one or more search queries, where each dimension of the graph corresponds to a characteristic of the executed search. For example, each dimension of the multi-dimensional display may correspond to one of relevance, price, date, recency, image quality, image size, geographic distance or any other appropriate search characteristic. Each search query result may be represented by small summaries, such as, for example, a small thumbnail image, an icon, or a fragment of text (e.g., a single word or short phrase). Since any form of summary may take up non-zero area in the plot of the multi-dimensional display, not all search results may be able to be displayed simultaneously on a single display document. In such a case, the plot may span across multiple pages of the document (i.e., a user may "page" from one page of the document to the next to view all of the results). In some implementations of the invention, the size of each of the summaries of the results may vary (e.g., more relevant equals a bigger icon or image).

Because results may not be points on the plot, two results may overlap if centered about their true points. Therefore, consistent with the invention, the results may not have to be positioned exactly on the multi-dimensional plot. Results plotted on a dimension corresponding to relevance, in particular, may have their position shifted to a significant extent along the relevance dimension. So long as the relative ordering along the different dimensions is substantially preserved, some liberties may be taken in order to plot more results on the multi-dimensional display document. Optimal packing to preserve certain constraints of minimizing out-of-positionness may likely be NP-hard. However, several simple greedy solutions may be possible to shift result positions slightly to fit more results in the multi-dimensional display document, and to make sure that whatever results are displayed may not be too far from their correct positions. In some implementations, for example, most relevant to least relevant results may be positioned accurately, but if there is overlap with a prior result, then results may be "shifted" in the less relevant direction until there is no overlap. Or, alternatively, an overlapping 'more relevant' result can be shifted up or down on the other axis up X % of the size of the thumbnails if it will prevent an overlap. However, this shift should be performed only if it also preserves the relative ordering along the other dimension with all currently positioned results.

In one implementation, a fixed number of results may be positioned per "page" of the multi-dimensional display document. For example, each "page" may include the N most relevant results, or the N most relevant results and the M results that optimize another dimension (e.g., 10 most relevant and 10 cheapest in price). Displaying the N most relevant results, and the M results that optimize another dimension, provides advantage over a simple list because it simultaneously shows the relevance of the results and the ordering of the results in at least one other dimension.

In another implementation, the particular overlaps on the plot might determine what results get displayed (e.g., continue including more results until there is room for no more, or until a threshold on number or relevance is passed). In yet another implementation, more relevant results may be permitted to overlap on top of less relevant results, but the amount of overlap may be permitted to increase only as relevance decreases, so that from the more relevant side of the plot to the less relevant side there is a sort of "fanning-out" with more and more results able to "peek out" from under their "neighbors."

Consistent with some implementations of the invention, natural restrictions may be performed on the range of one or more of the dimensions of the multi-dimensional display document (e.g., price restrictions, date restrictions). Restriction on the range of one or more of the dimensions may be achieved by implementing multiple (e.g., 2, 3, or 4) overlapping ranges that have different granularities (e.g., prices in $100 increments and prices in $20 increments). The user may implement a restriction (e.g., by "clicking" on a range if using a mouse interface) that "zooms" the display in, causing the selected range to "zoom" out to fill substantially the entire display of the multi-dimensional document.

In a further implementation, the axes of the plot on the multi-dimensional display document may be scaled. The axes, thus, need not be linear, and any monotonic transformation of an axis may be used (e.g., a logarithmic scale for price or recency). In some instances, if a large gap between clusters of results exists, a monotonic "squeezing" of the space between the results could be used to bring them closer together and fit more results into the plot with less blank space (e.g., a simple piecewise linear transformation could be used that simply uses a different linear scaling for the gap between two clusters of results). This might be useful if the set of results plotted includes the top N results that optimize each axis independently. In another implementation, the multi-dimensional display document may plot multiple dimensions, with none of the dimensions being relevance (e.g., price vs. merchant rating, image quality vs. staleness, date vs. poster reputation, etc.).

Figure 7:
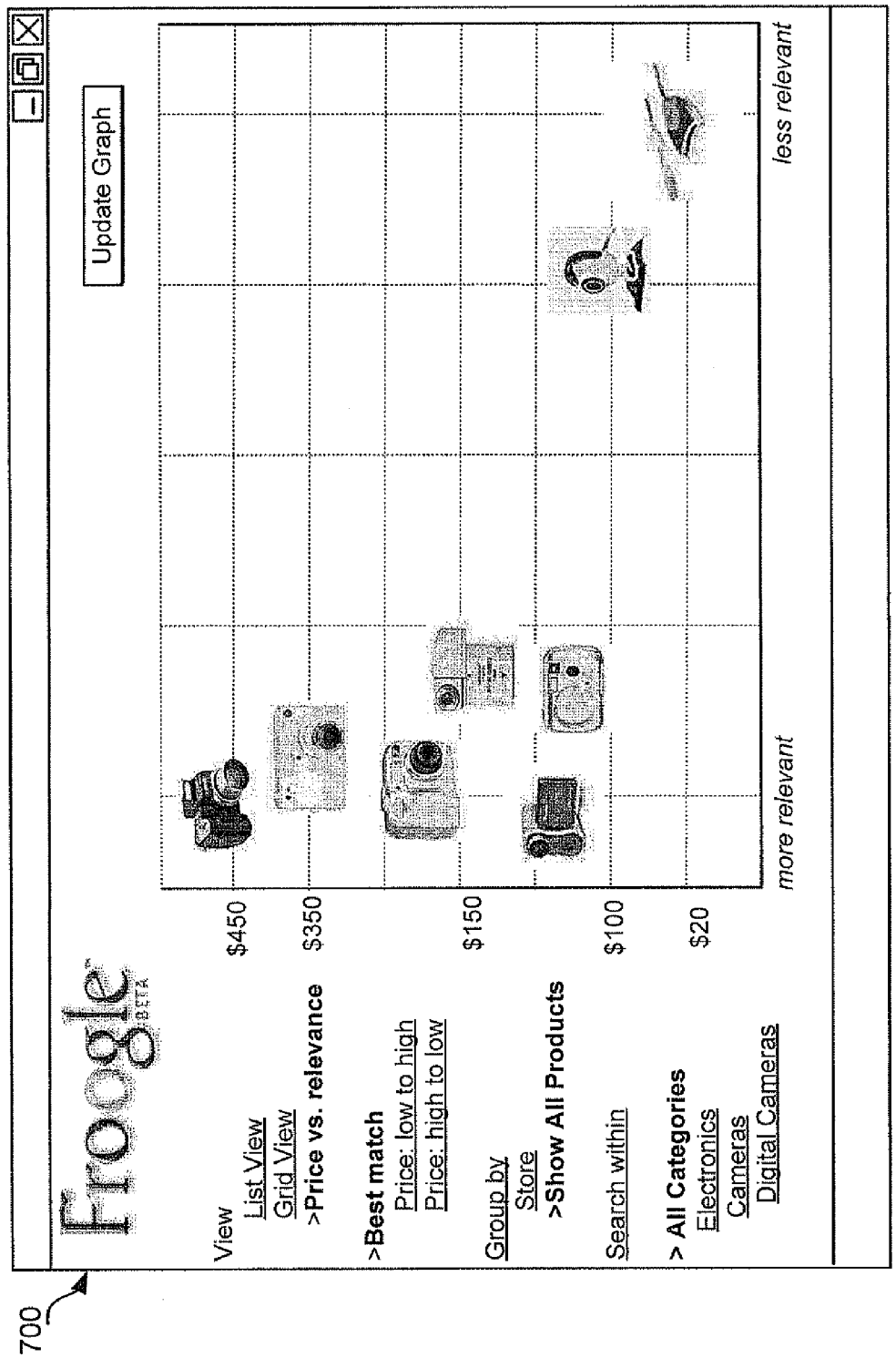
FIG. 7 is a diagram of an exemplary two-dimensional display document according to an implementation consistent with the principles of the invention.

FIG. 7 illustrates an exemplary two-dimensional display document 700 consistent with one implementation of the invention. Two-dimensional display document 700 depicts a "graph view" of the results of a product search related to 'digital cameras' where the y-axis corresponds to 'price' and the x-axis corresponds to 'relevance.'

If the user is using a "mouse," moving the mouse over a target in the multi-dimensional display document (e.g., a thumbnail image, icon, etc.) may trigger the display of additional information. For example, in the product searching context, thumbnails with no text might be used to represent each product result and, upon "mouse-over" of a particular thumbnail, the title, exact price, and merchant for the offer might be displayed. Another possible representation for product searching might be a thumbnail image with a single word or phrase displayed in close association with the image (e.g., inside of, on top of, or in close proximity to). In certain subdomains (e.g., product categories), domain-specific summaries may be used. For example, in electronics domains, for queries that return many different models, the model number/string may be an appropriate one word label. For a digital camera query, thumbnails of digital cameras may appear with labels such as "S400," "A70," "G3," etc. Accessories may be labeled with the word that describes the category of accessory (e.g., 'battery,' 'case,' 'book,' etc.). The accessory offers could be classified as accessories by price clustering or other classification signals and classified into the domain specific accessory types by another simple classifier. Upon "mouseover" of the word or phrase, additional information may be displayed.

Figure 8:
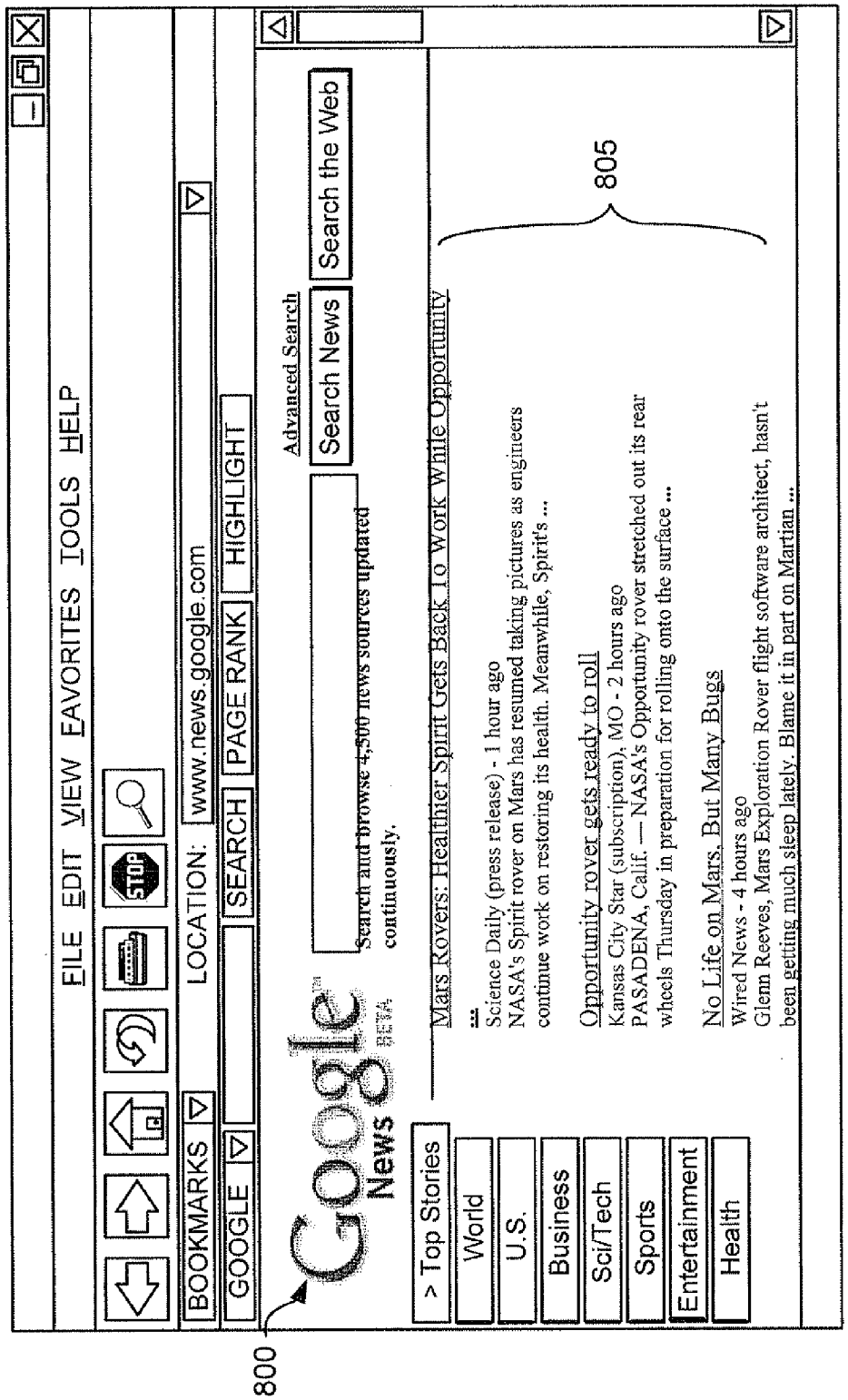
FIG. 8 is a diagram of an exemplary document with news links according to an implementation consistent with the principles of the invention.
Figure 9:
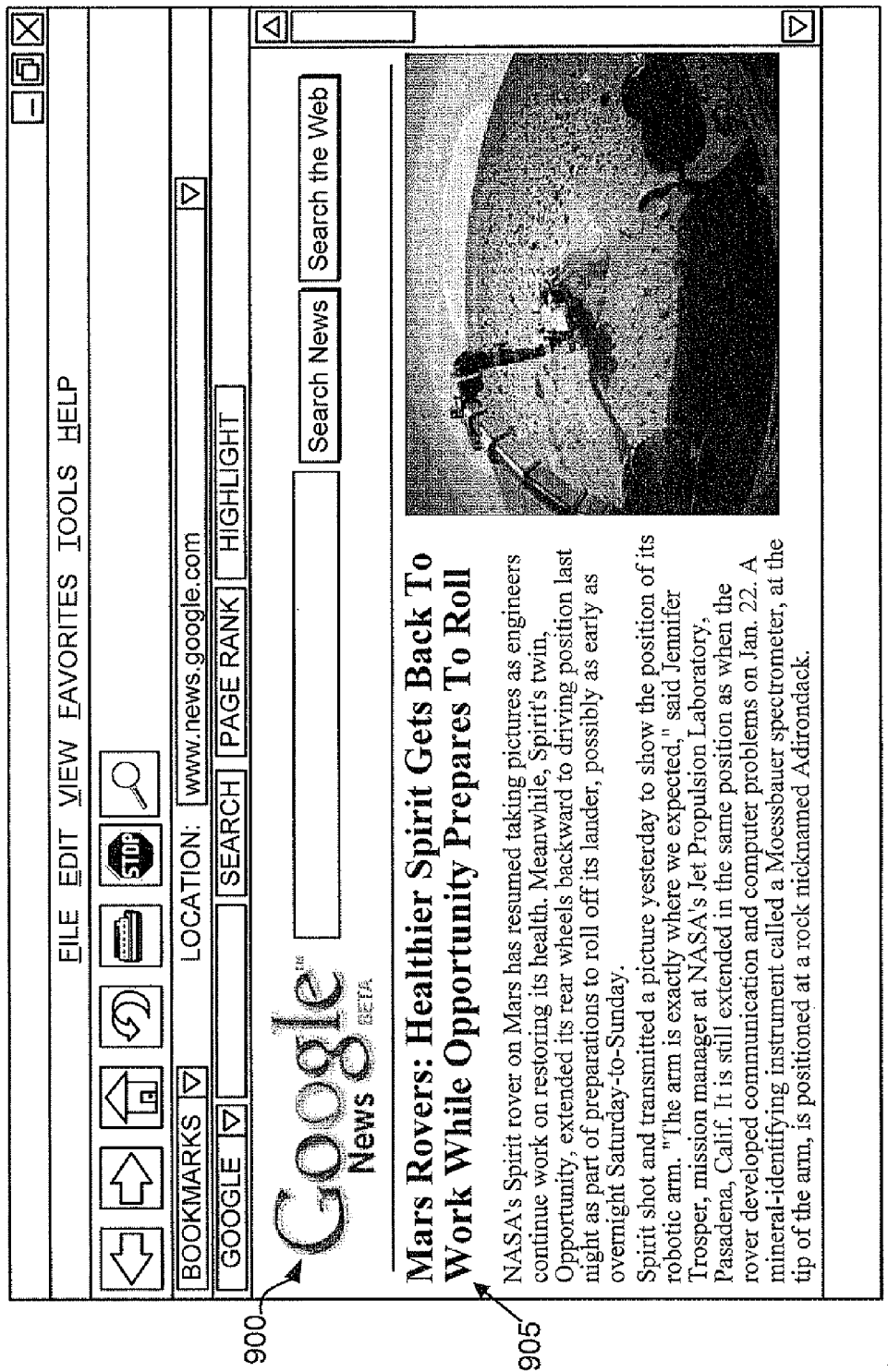
FIG. 9 is a diagram of an exemplary news document according to an implementation consistent with the principles of the invention.

Server 120 may determine whether a user selects a result from the multi-dimensional display document (act 435). In one implementation, for example, the user may select a result by "clicking" on an associated image, icon, or text, with a mouse. If the user selects a result from the provided multi-dimensional display document, then server 120 may provide a document(s) that corresponds to the selected result (act 440). For example, FIG. 9 illustrates an exemplary news document 900 that includes a news story 905 that corresponds to a specific selection by a user. According to another exemplary aspect, server 120 may, upon selection of a result, provide a document with one or more links to documents that correspond to the selected result. For example, FIG. 8 illustrates an exemplary document 800 that includes multiple links 805 corresponding to a news story related to a news search query provided by a user. If the user selects one of the one or more links of the provided document, then server 120 may provide a document(s) that corresponds to the selected link. For example, FIG. 9 illustrates an exemplary news document 900 that includes a news story 905 that corresponds to a specific link selected by a user.

Returning to act 435, if the user does not select a result from the multi-dimensional display document, then server 120 may determine whether the user selects a "next page" or a restricted range of the multi-dimensional display document (act 445). More results may exist then can fit on one page of the multi-dimensional display document, therefore, the user may select a subsequent page to view additional results. The user may further select a restricted range (e.g., by "clicking" on a range if using a mouse interface) to "zoom" the display in, causing the selected range to "zoom" out to substantially fill the entire display of the multi-dimensional display document. Server 120 may provide the selected "next page," or the restricted range, of the multi-dimensional display document to the user (act 450). If the user does not select a "next page" or a restricted range, then processing may return to act 415, with receipt of another search query(ies) from the user.

CONCLUSION

Systems and methods consistent with the principles of the invention enable the sorting of search results by multiple different characteristics, and display of those search results on a multi-dimensional graph. Each dimension of the multi-dimensional graph may correspond to one of the multiple characteristics.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts have been described with regard to FIGS. 4A and 4B, the order of the acts may be modified in other implementations consistent with the principles of the invention. Additionally, while aspects of the invention has been described with respect to searching information stored in the world-wide web (WWW), one skilled in the art will recognize that the sorting and displaying of search results in multiple dimensions, consistent with the principles of the invention, may be employed in any other type of information searching system. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

Further, certain portions of the invention have been described as "logic" that performs one or more functions. This logic may include hardware, such as an application specific integrated circuit or a field programmable gate array, software, or a combination of hardware and software.

The scope of the invention is defined by the following claims and their equivalents.

What is claimed is:

1. A method comprising:
   plotting, by one or more processors, search results, identified based on a search query, on a graph;
   determining, by the one or more processors, that at least two of the plotted search results are plotted at a same position on the graph;
   determining, by the one or more processors, that a first plotted search result, of the at least two plotted search results, is more relevant to the search query than a second plotted search result, of the at least two plotted search results;
   shifting, by the one or more processors, the first plotted search result along either a first axis or a second axis so that the at least two plotted search results are not plotted at the same position; and
   providing, by the one or more processors, the graph, including the shifted first plotted search result, for display.

2. The method of claim 1, further comprising:
   associating first information with the first plotted search result;
   associating second information with the second plotted search result;
   providing, for display, the first information at a first size; and
   providing, for display, the second information at a second size, the first size being different than the second size.

3. The method of claim 1, further comprising:
   receiving information indicating a selection of the first plotted search result or the second plotted search result; and
   providing, for display and based on the received information, additional information within the graph, the additional information being associated with the first plotted search result or the second plotted search result.

4. The method of claim 1, further comprising:
   receiving information indicating a selection of the first plotted search result or the second plotted search result; and
   providing, for display and based on the received information, a link to a document that is associated with the first plotted search result or the second plotted search result.

5. The method of claim 1, further comprising:
  plotting the first plotted search result on a first particular location of the graph based on a measure of relevance of the first plotted search result; and
  plotting a third search result, of the search results, on a second particular location of the graph based on a measure of relevance of the third search result, the first particular location being different than the second particular location.

6. The method of claim 1, where the first plotted search result is represented on the graph by a fragment of text obtained from the first plotted search result.

7. The method of claim 1, where the first plotted search result is represented on the graph by an image associated with the first plotted search result and a size of the image is based on a measure of relevance, of the first plotted search result, to the search query.

8. A device comprising:
  a processor; and
  a memory including a plurality of instructions that, when executed by the processor, cause the processor to:
    plot search results, on a graph, the search results being identified as relevant to a search query;
    determine that at least two of the plotted search results are plotted at a same position on the graph;
    determine that a first plotted search result, of the at least two plotted search results, is more relevant to the search query than a second plotted search result, of the at least two plotted search results;
    shift the first plotted search result along either a first axis or a second axis so that the at least two plotted search results are not plotted at the same position; and
    provide the graph, including the shifted first plotted search result, for display.

9. The device of claim 8, where the processor is further to:
  associate first information with the first plotted search result;
  associate second information with the second plotted search result;
  provide, for display, the first information at a first size; and
  provide, for display, the second information at a second size, the first size being different than the second size.

10. The device of claim 8, where the processor is further to:
  receive information indicating a selection of the first plotted search result or the second plotted search result; and
  provide, for display and based on the received information, additional information within the graph, the additional information being associated with the first plotted search result or the second plotted search result.

11. The device of claim 8, where the processor is further to:
  receive information indicating a selection of the first plotted search result or the second plotted search result; and
  provide, for display and based on the received information, a link to a document that is associated with the first plotted search result or the second plotted search result.

12. The device of claim 8, where the processor is further to:
  plot the first plotted search result on a first particular location of the graph based on a measure of relevance of the first plotted search result; and
  plot a third search result, of the search results, on a second particular location of the graph based on a measure of relevance of the third search result, the first particular location being different than the second particular location.

13. The device of claim 8, where the first plotted search result is represented on the graph by a fragment of text obtained from the first plotted search result.

14. The device of claim 8, where the first plotted search result is represented on the graph by an image associated with the first plotted search result and a size of the image is based on a measure of relevance, of the first plotted search result, to the search query.

15. A non-transitory computer-readable medium storing instructions, the instructions comprising:
  one or more instructions which, when executed by at least one processor, cause the at least one processor to plot search results, identified based on a search query, on a graph;
  one or more instructions which, when executed by the at least one processor, cause the at least one processor to determine that at least two of the plotted search results are plotted at a same position on the graph;
  one or more instructions which, when executed by the at least one processor, cause the at least one processor to determine that a first plotted search result, of the at least two plotted search results, is more relevant to the search query than a second plotted search result, of the at least two plotted search results;
  one or more instructions which, when executed by the at least one processor, cause the at least one processor to shift the first plotted search result along either a first axis or a second axis so that the at least two plotted search results are not plotted at the same position; and
  one or more instructions which, when executed by the at least one processor, cause the at least one processor to provide the graph, including the shifted first plotted search result, for display.

16. The medium of claim 15, further comprising:
  one or more instructions to associate first information with the first plotted search result;
  one or more instructions to associate second information with the second plotted search result;
  one or more instructions to provide, for display, the first information at a first size; and
  one or more instructions to provide, for display, the second information at a second size, the first size being different than the second size.

17. The medium of claim 15, further comprising:
  one or more instructions to receive information indicating a selection of the first plotted search result or the second plotted search result; and
  one or more instructions to provide, for display and based on the received information, additional information within the graph, the additional information being associated with the first plotted search result or the second plotted search result.

18. The medium of claim 15, further comprising:
  one or more instructions to receive information indicating a selection of the first plotted search result or the second plotted search result; and
  one or more instructions to provide, for display and based on the received information, a link to a document that is associated with the first plotted search result or the second plotted search result.

19. The medium of claim 15, further comprising:
  one or more instructions to plot the first plotted search result on a first particular location of the graph based on a measure of relevance of the first plotted search result; and
  one or more instructions to plot a third search result, of the search results, on a second particular location of the graph based on a measure of relevance of the third search result, the first particular location being different than the second particular location.

20. The medium of claim 15, where the first plotted search result is represented on the graph by an image obtained from the first plotted search result and a size of the image is based on a measure of relevance of the first plotted search result.

\* \* \* \* \*